G. C. BARTRAM
CONCRETE PIPE.
APPLICATION FILED DEC. 28, 1917.
1,292,992.
Patented Feb. 4, 1919.
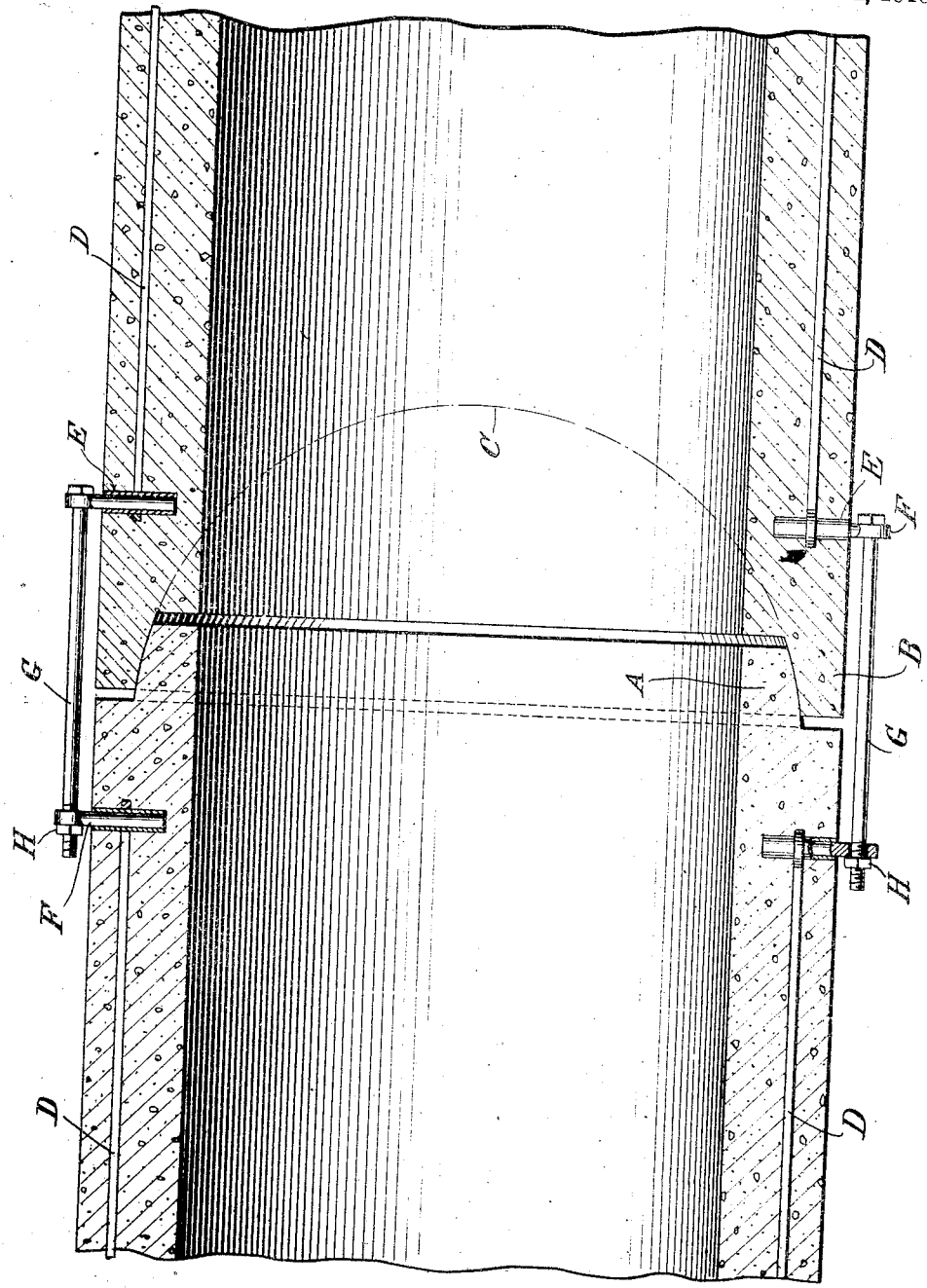
INVENTOR
George C. Bartram
BY
Kerr, Page, Cooper & Hayward
ATTORNEY

UNITED STATES PATENT OFFICE.

GEORGE C. BARTRAM, OF EAST ORANGE, NEW JERSEY.

CONCRETE PIPE.

1,292,992.

Specification of Letters Patent.    Patented Feb. 4, 1919.

Application filed December 28, 1917. Serial No. 209,309.

*To all whom it may concern:*

Be it known that I, GEORGE C. BARTRAM, a citizen of the United States, residing at East Orange, in the county of Essex and State of New Jersey, have invented certain new and useful Improvements in Concrete Pipes, of which the following is a full, clear, and exact description.

When a reinforced concrete pipe of large diameter is laid under water or in water bearing strata of yielding character it is difficult to secure for it a foundation of sufficient firmness to prevent its uneven subsidence, so that when the pipe must be made tight and pressure resisting, some special means must be resorted to to prevent leakage at the joints, where there is any break from true alinement or grade.

In some cases such pipes are used to carry sewerage or the like where leakage is not a controlling factor, and in such cases the integrity of the line is sufficiently maintained even though there be displacements of adjacent sections with consequent impairment at the joints. With such conditions as these my present invention has to deal.

I have devised a form of concrete pipe which is particularly adapted for subaqueous sewer pipes and which permits a certain amount of uneven settling or sinking of adjacent sections without destroying or impairing the useful properties of the line, for which purpose I cast the abutting ends of the concrete sections as the male and female parts of a ball and socket joint with the capability of a certain play or movement and to preserve the integrity of the line I provide across the joints metal ties or bonds between the ends of longitudinal reinforcing bars or rods extending from end to end of each section. This pipe I so construct and lay that the sections are firmly and securely held together end to end by a continuous metal reinforcement while at the same time the sections may settle unequally from true alinement without destroying or materially affecting the continuity of the whole as a conduit.

This improvement is illustrated in the accompanying drawing which shows in section the abutting ends of two sections of pipe and the means for completing between them a continuous reinforcement.

The pipe, although not so shown, is intended to be a reinforced concrete pipe of the ordinary character, and generally of large diameter suitable for use as a subaqueous sewer, as for example, for a city on the large lakes where the sewerage is carried out from the city to a more or less distant point in the lake.

Each section is molded with a relative short spigot A at one end, and a corresponding bell B at the other. Both spigot and bell, however, are molded with their contiguous faces conforming to the surface of a sphere of proper dimensions, as indicated by the dotted line C, and of such relative dimensions that when in engagement a space is left between the spigot and the base of the bell, and between the two outer ends of the sections as shown.

This provides for a movement of certain extent of one section with respect to the other, but to provide means for maintaining the ends in contact, reinforcing rods D are laid longitudinally in the cement when the sections are molded and their ends surround sockets E, set in the cement. To secure the objects of this invention, but two of these rods are used.

When in the laying of the pipe two sections are joined, steel plugs F with eyes at their outer ends are driven into the sockets E and stout rods G are then passed through the eyes and by means of nuts H, the plugs and the ends of the sections are drawn closely together. This work may be and is usually performed by divers, as the pipe is under water.

If deemed necessary, a slight play may be provided for by not tightening up the nuts so that the pipe may sink slightly at the joint, or one section may sink with reference to the other, thus permitting one of the ball and socket members to turn over the other.

It is, of course, well known that any two rigid members, whether pipes or not, will be capable of a certain relative movement from a right line if they are provided with a joint in the nature of a ball and socket, and this I do not claim as of my invention.

What I claim is:

A concrete pipe composed of sections, each section having a bell and spigot end, the spigot of one section interfitting in the bell of an adjacent section and forming a ball and socket joint, longitudinal reinforcing rods embedded in said sections, uniformly spaced sockets embedded in said sections near the ends thereof and connected by said rods, the sockets in one section being oppositely disposed to the sockets in the next adjacent section, plugs inserted in said sockets, and adjustable tie rods uniting the proximate and oppositely disposed plugs.

In testimony whereof I affix my signature.

GEORGE C. BARTRAM.